Patented Jan. 30, 1940

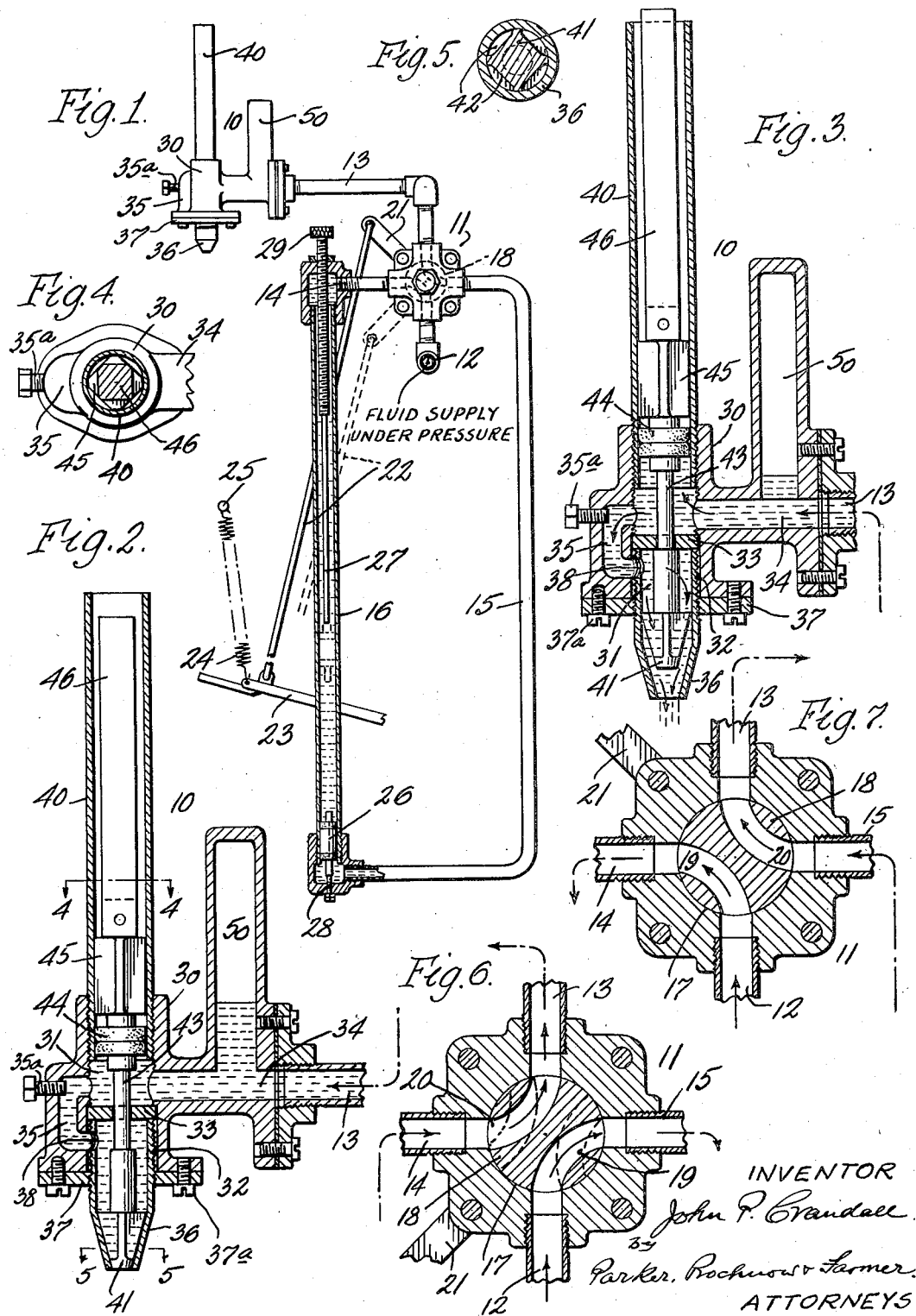

2,188,676

UNITED STATES PATENT OFFICE 2,188,676

APPARATUS FOR DISPENSING MEASURED CHARGES OF FLUENT MATERIAL

John P. Crandall, Buffalo, N. Y.

Application November 9, 1938, Serial No. 239,667

5 Claims. (Cl. 221—84)

This invention relates to improvements in apparatus or mechanisms for dispensing liquids or fluent materials in predetermined, desired, measured quantities. Apparatus embodying the improvements are suited, and primarily intended, for use for filling collapsible tubes and other small receptacles with liquids or other fluent materials, such as pastes and creams, but the invention is not necessarily restricted in application to filling machines for such purposes, but is applicable for other uses involving the delivery of fluent materials in accurately measured quantities. For convenience, the term "liquid" is employed in the following description of the apparatus to designate the materials handled by the same, but it is to be understood that it is not thereby intended to restrict use of the invention to liquids as distinguished from other fluent substances adapted to be dispensed by the apparatus.

The objects of the invention are to provide a desirable and efficient mechanism of simple, inexpensive construction by means of which fluent substances can be dispensed in, or receptacles filled with, measured quantities or charges of one or another predetermined volume for which the mechanism may be set or adjusted; also to provide such a mechanism having a valved discharge device which acts automatically to shut off the discharge of the material promptly after the delivery of each measured quantity thereof and prevent dribbling, waste or surplus discharge of the material; which discharge device is actuated automatically by the supply pressure of the material; and also to provide a dispensing or receptacle filling apparatus which has the other features of improvement and advantage hereinafter described and set forth in the claims.

In the accompanying drawing:

Fig. 1 is a partially schematic view showing, partly in elevation and partly in section, a dispensing mechanism embodying my invention.

Fig. 2 is an enlarged sectional elevation of the discharge head or device thereof, showing the discharge valve closed.

Fig. 3 is a similar view of the discharge device showing the open position of the valve.

Figs. 4 and 5 are sections of the discharge device on lines 4—4 and 5—5 respectively, Fig. 2.

Figs. 6 and 7 are sectional views of the control or charge supply valve of the mechanism, showing two different open positions thereof.

Referring first to Fig. 1, the dispensing apparatus comprises a valved discharge head or device 10 and measuring mechanism including a control or supply valve 11 for delivering the liquid in measured quantities or charges from a source of liquid supply under pressure to the discharge device. The measuring or control mechanism may be of various different suitable types or constructions adapted to deliver the liquid under pressure in successive, like or measured quantities to the discharge device.

As illustrated in the drawing, this measuring mechanism comprises a pipe or conduit 12 which leads from a pump or other source (not shown) for supplying the liquid under pressure. This pipe 12 is connected to the casing of the control valve 11 which, in turn, is connected by a delivery pipe or conduit 13 with the discharge head 10. The casing of the control valve is also connected by pipes or conduits 14 and 15 with opposite ends of a measuring chamber which is shown in the form of an elongated cylinder 16. The pipes 12, 13, 14 and 15 communicate respectively by ports in the casing of the valve 11 with a central, circular valve chamber 17 in the casing, about which chamber the ports are preferably disposed at 90° angles apart, as shown in Figs. 6 and 7. Arranged to oscillate in the valve chamber is a circular valve plug 18 provided with two ports 19 and 20. In the position of the valve shown in Fig. 7, the ports 19 and 20 connect the supply pipe 12 with the pipe 14, and the pipe 15 with the discharge pipe 13, while in the other position of the valve shown in Fig. 6, the supply pipe 12 is connected with the pipe 15, and the delivery pipe 13 is connected with the pipe 14.

The valve plug 18 is adapted to be moved from one to the other of these different positions by suitable means, such for example, as an arm 21 attached to one end of the valve plug 18 and connected by a link or rod 22 to an operating foot treadle 23. By depressing this treadle, the valve plug is rotated from the position shown in Fig. 7, through an angle of 90° which carries its ports 19 and 20 to the position shown in Fig. 6. Preferably the valve is automatically returned to its initial position (indicated in Figs. 1 and 7) by suitable means, such as a spring 24 which, as diagrammatically represented in Fig. 1, may be attached at one end to the treadle 23 and at the other end to a part 25 of the supporting frame (not shown) for the mechanism, or any other suitable anchorage means.

In the position of the control valve shown in Fig. 6, the liquid under pressure will pass, as indicated by the arrows in said figure, from the supply pipe through the port 19 and pipe 15 into the lower end of the measuring cylinder 16 beneath a piston 26 therein and raise the piston in the cylinder until it is arrested by engagement with an adjustable stop 27, the liquid in the cylinder above the piston being forced by the upwardly moving piston out through the pipe 14 and valve port 20 into the delivery pipe 13 and discharge device 10. When the control valve is moved to the Fig. 7 position, the liquid under pressure will pass from the supply pipe 12 through the valve port 19 and pipe 14 into the upper end of the measuring cylinder, and move the piston 26 downwardly until arrested by a suitable stop 28 in the lower end of the cylinder, the liquid in the cylinder beneath the piston being forced out by the downwardly moving piston through the pipe 15 and valve port 20 into the delivery pipe 13 and discharge head 10, as indicated by the arrows in said Fig. 7. Thus, a measured quantity of the liquid, of a volume determined by the length of travel of the piston in the cylinder 16, is delivered through the control valve 11 to the discharge device each time the control valve is placed in either of the two open positions shown in Figs. 6 and 7, by the operation of the treadle. The volume of the quantity of the liquid delivered to the discharge device is predetermined as desired, by appropriate adjustment of the piston stop 27. This stop, as shown, is formed by a rod arranged axially in the upper portion of the cylinder and having a screw threaded portion extending out through and adapted to turn in a screw threaded hole in the upper head of the cylinder, the outer end of the stop rod being provided with a knob or handle 29 for turning it to adjust it up or down, as desired, in the cylinder.

The discharge head or device 10 comprises a body or casing 30 which is suitably secured with a liquid-tight joint to the outer end of the delivery pipe 13. At its outer end, this body 30 is provided with vertically alined upper and lower chambers 31 and 32 separated by a partition wall 33. The upper chamber communicates by a horizontal passage 34 in the body with the adjacent end of the delivery pipe 13, and is connected by a passage 35 with the lower chamber 32. The flow of the liquid through this connecting passage can be suitably regulated as by a screw 35a projecting into the passage and adapted to more or less restrict the passage by adjusting the screw in or out. A tubular discharge nozzle 36 having a downwardly tapered or frusto-conical, lower end projects out of the lower end of the lower chamber 32. In the construction shown in the drawing, this nozzle is formed by a tube which is screw-threaded and extends into the lower chamber 32 through a screw-threaded hole in a bottom plate 37 detachably fastened, as by screws 37a to the body 30 at the bottom end of the chamber 32, and the partition wall 33, which is a removable circular disk, is clamped in place between the upper end of the nozzle tube and an internal annular shoulder formed in the body 30. The nozzle tube has a hole 38 in its side registering with the lower end of the connecting passage 35, by which the nozzle communicates with the upper chamber 31. Extending upwardly from the body 30 in communication with the upper chamber 31 and in axial alinement with the nozzle tube 36, is an open-ended cylinder 40 which, as shown, may be formed by a tube having a screw-threaded lower end screwed into an internally threaded boss on the body 30.

Axially movable in the discharge nozzle is a valve plug 41 having a frusto-conical lower end adapted to seat in and close the tapered lower end of the nozzle. Above its tapered, conical lower end portion, the sides of the valve plug are preferably grooved lengthwise at 42, see Fig. 5, to reduce the area of its upper end and form channels for the free flow of liquid past the valve plug when in its raised or open position. This valve is fixed to or formed on the lower end of a rod 43 which extends up through a hole in the partition wall 33 and into the cylinder 40, and has fixed or formed thereon a piston 44 which is movable up and down in the cylinder 40. This piston may be provided with cupped, flexible packing washers or other suitable packing which will slidably fit the internal surface of the cylinder and prevent passage of liquid in the cylinder past the piston so that the piston is adapted to be raised in the cylinder by the pressure thereon of the liquid in the chamber 31 and the lower end of the cylinder. Preferably, the valve or piston rod 43 extends upwardly in the cylinder above the piston and is provided above the piston with a guide portion 45 of approximately square or other non-circular cross section having spaced, vertical guide edges engaging the wall of the cylinder for guiding the movements of the piston therein. Connected to the piston rod above this guide portion in the cylinder, is a weight 46 which is adapted, as hereinafter explained, to move the piston down against the pressure of the liquid on its underside for seating the plug 41 to close the discharge valve. In order to make the weight heavy enough for this purpose, it may be either made of sufficient length and bulk or, if necessary, it may be supplemented by an additional weight attached to its upper end.

An air chamber 50 is formed in the discharge device body 30 communicating at its lower end with and extending upwardly from the passage 34 and closed at its upper end. The liquid is adapted to rise and fall to some extent in this chamber, determined by an air cushion trapped in the chamber above the liquid.

By the described construction of the discharge head, the bottom plate 37 can be removed and the nozzle tube 36, together with the valve 41, partition disk 33, piston 44 and its rod and the weight 46, can all be pulled out of the discharge head, thus permitting ready assembling and disassembling and cleaning of all the parts. The piston rod is shouldered as shown, above and below the partition disk 33, the lower shoulder limiting the opening movement of the valve and piston and the other shoulder acting to remove the disk when pulling the valve and other parts out of the head.

The operation of the apparatus for filling receptacles with like measured charges of liquid, assuming the discharge valve 41 to be closed, the control valve 11 in the position shown in Fig. 7, and the discharge head and the pipes filled with the liquid, is as follows:

A receptacle is placed under the discharge nozzle and the treadle depressed to shift the control valve from the Fig. 7 to the Fig. 6 position. The liquid under pressure will then pass from the supply pipe through the valve and pipe 15 into the lower end of the cylinder 16 and raise the piston 26 therein until it is arrested by the upper stop 27. This upward movement of the piston forces an amount of liquid from the cylinder above the piston equal to the amount of liquid admitted to the cylinder below the piston, out through the pipe 14 and control valve into the delivery pipe 13. This increases the pressure of the liquid in the discharge head and lifts the piston 44 to the position shown in Fig. 3, thus lifting the valve 41 and opening the discharge nozzle, and a volume of liquid equal to that admitted to the measuring cylinder 16 will discharge from the nozzle into the receptacle. When the upward movement of the piston 26 in the measuring cylinder is arrested, pressure will no longer be exerted on the liquid in the measuring cylinder above the piston and in the discharge head, and the piston 44 will be lowered by the weight 46 and move the valve down to its seat in the discharge nozzle, thus shutting off the discharge. This downward movement of the piston 44 by the weight is permitted by a displacement of the liquid below the piston into the air chamber 50 sufficient for the closing movement of the piston. The discharge valve only has to move a short distance from its open position and quickly and completely closes the nozzle upon the delivery of the measured charge of liquid from the nozzle. The treadle is then released and its spring raises it and returns the control valve 11 to its initial position, shown in Fig. 7, and during the return movement of the treadle and valve, the filled receptacle is removed from beneath the nozzle and replaced by an empty receptacle. This return of the valve to initial position permits the liquid to pass from the supply pipe through the valve and pipe 14 into the upper end of the measuring cylinder 16, and the liquid to discharge from the lower end of the cylinder through the pipe 15 and valve 11, thus delivering another measured charge of liquid to the discharge device and operating the latter as just above explained, to discharge this measured charge of the liquid.

The liquid pressure in the discharge head acts in opposite directions on the valve plug 41 and piston 44, but operates to lift the piston and valve, since the area of the piston exposed to the pressure is larger than that of the valve. While, as described, a weight is employed for moving the piston 44 downwardly to close the discharge valve, equivalent self-acting means, such as a spring, could be substituted for the weight.

In the mechanism constructed as illustrated, manifestly, a measured volume of liquid is discharged from the discharge device upon each downward and upward movement of the treadle.

The discharge device constructed and operating as described is not, however, restricted to use with a measuring mechanism constructed as disclosed, but can be employed in connection with other suitable mechanisms adapted to deliver successive like or measured quantities or charges of liquid under pressure to the discharge device.

I claim as my invention:

1. In an apparatus for dispensing fluent material in measured quantities, a discharge device having a receiving chamber to which the material is delivered in successive measured quantities under pressure, and a discharge chamber partitioned therefrom and having a restricted communication therewith, a discharge nozzle communicating with said discharge chamber, a valve plug movable axially to and from a seat in said nozzle for closing and opening said nozzle, a cylinder axially alined with said nozzle and communicating with said receiving chamber, a piston movable in said cylinder and connected to said valve plug to move therewith, said piston being actuated by pressure thereon of the material in said receiving chamber to unseat said valve plug, and self-acting means which move said piston to seat said valve plug when the pressure on the material delivered to said chamber is interrupted.

2. In an apparatus for dispensing fluent material in measured quantities, a discharge device having a receiving chamber to which the material is delivered in successive measured quantities under pressure, and a discharge chamber partitioned therefrom, a passage connecting said chambers, means for variably restricting said passage, a discharge nozzle communicating with said discharge chamber, a valve plug movable to and from a seat in said nozzle for closing and opening said nozzle, a valve operating member connected to said valve plug, said member being actuated by pressure thereon of the material in said receiving chamber to unseat said valve plug, and self-acting means which move said member to seat said valve plug when the pressure on the material delivered to said chamber is interrupted.

3. In an apparatus for dispensing fluent material in measured quantities, a discharge device having a receiving chamber to which the material is delivered in successive measured quantities under pressure, and a discharge chamber communicating with but separated by a partition from said receiving chamber, a discharge nozzle communicating with said discharge chamber, a valve plug movable axially to and from a seat in said nozzle for closing and opening said nozzle, a cylinder axially alined with said nozzle and communicating with said receiving chamber, a piston movable in said cylinder, a stem passing through said partition and connecting said piston to said valve plug, said piston and valve plug having unequal opposed areas on which the pressure of the material acts, the area of the piston being the larger and said piston being actuated by the pressure thereon to unseat said valve, and self-acting means which move said piston to seat said valve plug when the pressure on the material delivered to said chamber is interrupted.

4. In an apparatus for dispensing fluent material in measured quantities, a discharge device having a chamber to which the material is delivered in successive measured quantities under pressure, a discharge nozzle communicating with said chamber by a restricted passage, a valve plug movable to and from a seat for closing and opening said nozzle, a valve operating member connected to said valve plug, said member being actuated by pressure thereon of the material in said chamber to unseat said valve plug, and self-acting means which move said member to seat said valve plug when the pressure on the material delivered to said chamber is interrupted, said discharge device having an air cushion chamber in which a portion of the material may be displaced from said first mentioned chamber during the movement of said member in seating the valve plug.

5. In an apparatus for dispensing fluent material in measured quantities, a discharge device having a chamber to which the material is delivered in successive measured quantities under pressure, a discharge nozzle communicating with said chamber by a restricted passage, a valve plug movable axially to and from a seat in said nozzle for closing and opening said nozzle, a cylinder axially alined with said nozzle and communicating with said chamber, a piston movable in said cylinder and connected to said valve plug, said piston being actuated by pressure thereon of the material in said chamber to unseat said valve plug, and self-acting means which move said piston to seat said valve plug when the pressure on the material delivered to said chamber is interrupted, said discharge device having an air cushion chamber in which a portion of the material may be displaced from said first mentioned chamber during the movement of the piston in seating the valve plug.

JOHN P. CRANDALL